United States Patent
Wiegand et al.

(10) Patent No.: US 11,337,450 B2
(45) Date of Patent: May 24, 2022

(54) HIGH CALORIE, UHT TREATED LIQUID NUTRITIONAL COMPOSITIONS

(71) Applicant: Fresenius Kabi Deutschland GmbH, Bad Homburg (DE)

(72) Inventors: Susanne Wiegand, Frankfurt am Main (DE); Katy Becker, Bad Homburg (DE); Martin Ammann, Neu Isenburg (DE); Jose Maria Mainou-Sierra, Ober-Mörlen (DE)

(73) Assignee: FRESENIUS KABI DEUTSCHLAND GMBH, Bad Homburg (DE)

( * ) Notice: Subject to any disclaimer, the term of this patent is extended or adjusted under 35 U.S.C. 154(b) by 491 days.

(21) Appl. No.: 15/712,421

(22) Filed: Sep. 22, 2017

(65) Prior Publication Data
US 2018/0084816 A1    Mar. 29, 2018

(30) Foreign Application Priority Data
Sep. 23, 2016 (EP) .................................. 16190390

(51) Int. Cl.
| | |
|---|---|
| *A23L 33/19* | (2016.01) |
| *A23L 33/00* | (2016.01) |
| *A23L 29/30* | (2016.01) |
| *A23L 33/10* | (2016.01) |
| *A23L 27/00* | (2016.01) |
| *A23L 33/115* | (2016.01) |
| *A23L 33/16* | (2016.01) |
| *A23L 33/125* | (2016.01) |
| *A23L 33/15* | (2016.01) |

(52) U.S. Cl.
CPC .............. *A23L 33/19* (2016.08); *A23L 27/84* (2016.08); *A23L 27/88* (2016.08); *A23L 29/30* (2016.08); *A23L 33/00* (2016.08); *A23L 33/10* (2016.08); *A23L 33/115* (2016.08); *A23L 33/125* (2016.08); *A23L 33/15* (2016.08); *A23L 33/16* (2016.08); *A23L 33/40* (2016.08); *A23V 2002/00* (2013.01)

(58) Field of Classification Search
None
See application file for complete search history.

(56) References Cited

U.S. PATENT DOCUMENTS

| | | | | |
|---|---|---|---|---|
| 5,221,668 | A * | 6/1993 | Henningfield | A61K 38/018 424/439 |
| 5,955,136 | A * | 9/1999 | Laaman | A23C 9/156 426/564 |
| 8,409,651 | B2 * | 4/2013 | Sliwinski | A23L 33/40 426/580 |
| 2003/0099722 | A1 * | 5/2003 | Baxter | A61K 31/198 424/679 |
| 2004/0005368 | A1 * | 1/2004 | Mann | A61K 31/198 424/725 |

* cited by examiner

*Primary Examiner* — Patricia A George
(74) *Attorney, Agent, or Firm* — Hylton-Rodic Law PLLC

(57) ABSTRACT

UHT treated liquid nutritional compositions are provided having a high caloric content of around 2.0 kcal/ml and higher, a savoury taste and comprising protein, carbohydrate and fat components. The nutritional compositions are for use in the treatment of patients having high energy needs.

14 Claims, 1 Drawing Sheet

Figure 1: evaluation of sweet taste
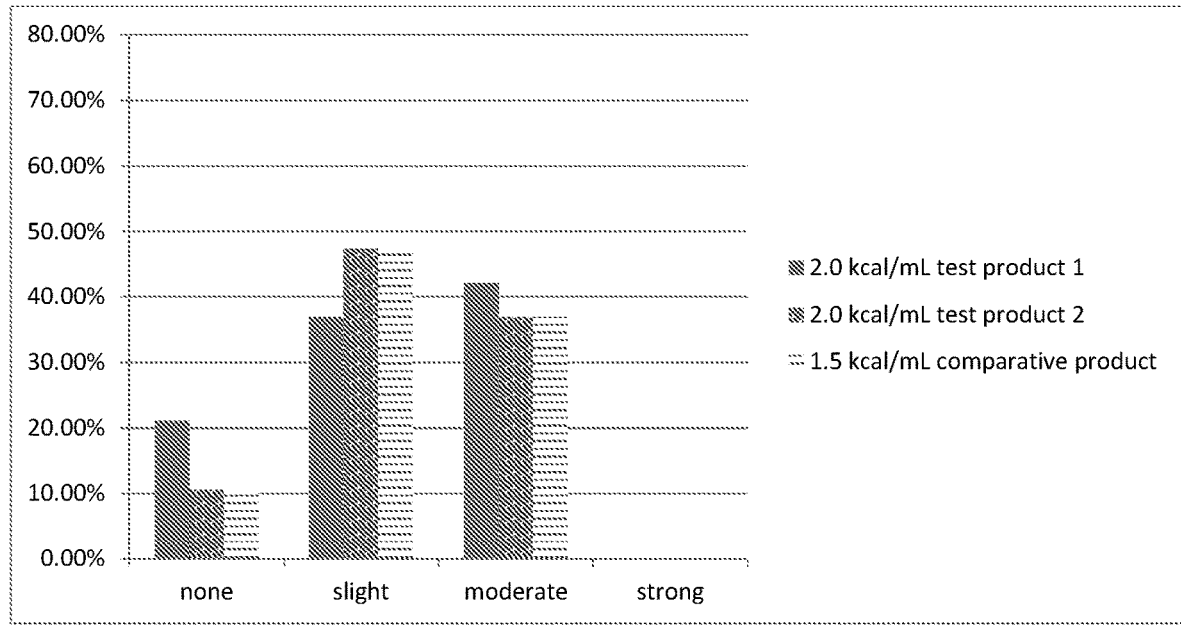
Figure 2: evaluation of salty taste
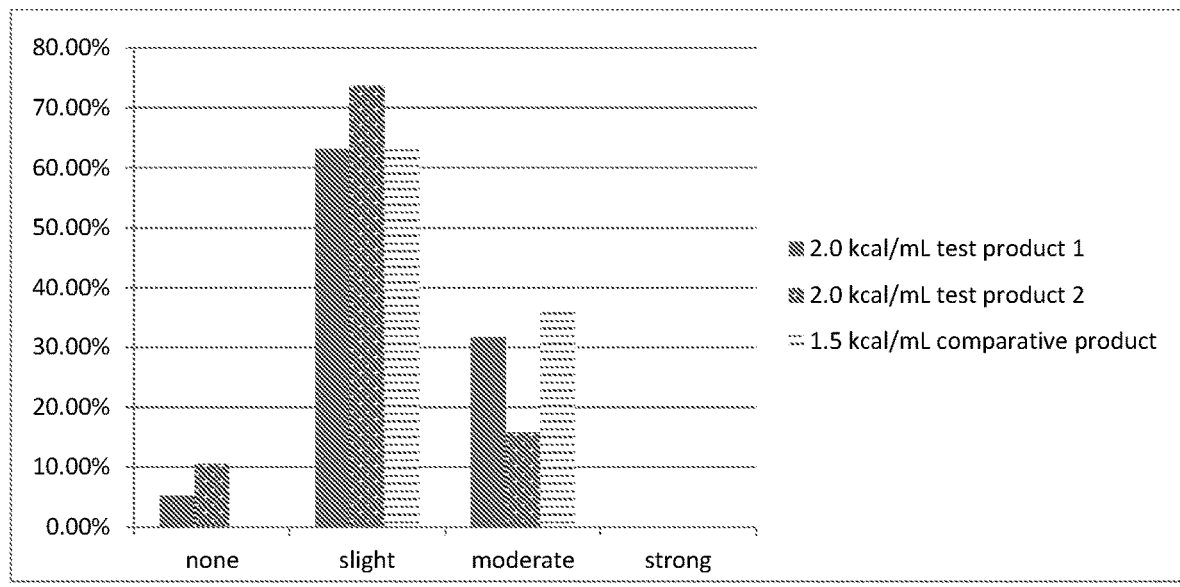

HIGH CALORIE, UHT TREATED LIQUID NUTRITIONAL COMPOSITIONS

CROSS REFERENCE TO RELATED APPLICATIONS

This application claims priority to European Application No. 16190390.1, filed on Sep. 23, 2016, the contents of which are hereby incorporated by reference in its entirety.

FIELD OF THE INVENTION

The present invention relates to nutritional compositions which comprise protein, carbohydrate, and fat components and have a high caloric content of around 2.0 kcal/ml and higher. The nutritional compositions are liquid even after UHT treatment and have a savoury taste. The nutritional compositions are provided as sip feeds suitable for patients with high energy needs.

BACKGROUND OF THE INVENTION

Liquid nutritional compositions, which are nutritionally complete, are labelled "high calorie" and having an energy density of 1.5 kcal/ml or more such as 2 kcal/ml are known in the art and are available in the market:

The commercial Resource® 2.0 (Nestle) composition has an energy density of 2.0 kcal/ml, but it is clearly sweet in taste. The same applies to Fresubin® 2.0 kcal (Fresenius Kabi). These compositions do not exhibit taste commonly described as savoury (i.e. they do not taste salty, but sweet). Consequently, these compositions are typically available with flavours associated with sweet taste (chocolate, vanilly, strawberry and the like).

Nestlé's Boost® VHC Vanilla 2.25 composition has an energy density of 2.25 kcal/ml, but a also a sweet vanilla flavoured taste. There is no savoury note.

Nestle's Resource® Soup has an energy density of only 1.5 kcal/ml.

In general products in the market are either sweet, not savoury in taste or they have a caloric content of at most 1.5 kcal/ml or they involve both drawbacks.

To support the well-being of patients having high energy needs and avoid their malnutrition, high caloric nutritional compositions having a taste different from bland or sweet shall be provided. Thus there is a need for liquid, non-sweet, savoury-type nutritionally complete nutritional composition with a caloric density of about 2.0 kcal/ml or more, such as 1.8-2.8 kcal/ml, preferably 1.8-2.5 kcal/ml, most preferred 1.9-2.1 kcal/ml. The desired savoury taste is based on (up to) moderately sweet taste combined with slight to moderately salty. Moreover, the nutritional compositions shall be perceived as spicy. Most importantly, in order to ensure patient compliance, an increase in sweet taste over savoury products of lower caloric content as known from the prior art shall be avoided.

To increase the overall caloric content of a nutritional composition, it is desirable to increase the proportion of all components of the nutritional composition to satisfy regulatory guidelines pertaining to nutritional compositions, preferably European regulatory guidelines. However, simply concentrating nutritional compositions typically causes increased interactions between the remaining components. Coagulation and/or precipitation are more likely to take place especially during an UHT treatment, resulting in a viscous composition that may not pass the UHT line.

In general regulatory guidelines concerning nutritional compositions prescribe minimum sodium, potassium and chloride concentrations relative to caloric content (i.e. mineral concentration increases with caloric density). In particular, the European regulatory guideline concerning nutritional compositions (FSMP-Directive 1999/21/EC) prescribes a minimum sodium concentration of 60 mg/100 ml for a 2 kcal/ml composition, a potassium concentration of 160 mg/100 ml for a 2 kcal/ml composition and a chloride concentration of 60 mg/100 ml for a 2 kcal/ml composition. This further complicates the production of high-calorie liquid nutritionally complete compositions, because high concentrations of proteins and sodium or potassium chloride lead to coagulation and/or precipitation, especially during UHT treatment. This complicates the addition of ample sodium or potassium chloride to the nutritional compositions during production to meet the regulatory requirements. Put in other words, taste modification by simple addition of salts is complicated if not ruled out by technical and regulatory requirements.

The problem to be solved by the present invention is to provide a nutritional composition which has a caloric content of 1.8-2.8 kcal/ml, 1.8-2.5 kcal/ml, most preferred 1.9-2.1 kcal/ml, has a savoury taste, is not perceived as sweet, in particular not sweeter than savoury products in the market, and which comprises salts in concentrations meeting regulatory guidelines to be nutritionally complete so that it is suitable as a sole source of nutrition, and which remains liquid after UHT treatment.

SUMMARY OF THE INVENTION

The inventors surprisingly found that the nutritional compositions described herein solve the above problem. They have a caloric content of 1.8-2.8 kcal/ml, 1.8-2.5 kcal/ml, most preferred 1.9-2.1 kcal/ml. They have a savoury taste. They are not sweeter than savoury-type products of the state of the art. They are comparable in salty taste to savoury-type products of the state of the art. They remain liquid after UHT treatment even when adapted to satisfy regulatory guidelines with respect to salt concentration in order to be declarable as "nutritionally complete" (i.e. suitable as sole source of nutrition).

The nutritional compositions comprise a protein component, a carbohydrate component, a fat component, minerals, and vitamins to be nutritionally complete.

In a first aspect a high calorie, UHT treated liquid nutritional base composition is provided comprising protein, fat, carbohydrates, vitamins and minerals, having an energy density of 1.8-2.8 kcal/ml, preferably 1.8-2.5 kcal/ml, most preferred 1.9-2.1 kcal/ml, wherein the protein content is 9-14 g/100 ml, and the carbohydrates comprise at least 90 wt. % (based on total carbohydrates) of maltodextrins having a dextrose equivalent (DE) of 13-22.

In a second aspect, a flavoured high calorie, UHT treated liquid nutritional composition is provided comprising a soup taste enhancing agent and/or a sweetness masking agent and optionally other taste enhancing agents.

In a third aspect, a high calorie, UHT treated liquid nutritional composition is provided obtainable by a process comprising a first step wherein the protein is dissolved in water, a second step wherein the sweetness masking agent is added, and one or more subsequent steps wherein all remaining ingredients are added.

BRIEF DESCRIPTION OF DRAWINGS

FIG. 1 represents evaluation of completed questionnaires of panelists for sweet taste.

FIG. 2 represents evaluation of completed questionnaires of panelists for salty taste.

DETAILED DESCRIPTION OF THE INVENTION

Definitions

"Caloric density" or "energy density" as used herein refers to the amount of calories provided per volume of the nutritional composition. The nutritional compositions herein have a caloric density of 1.8-2.8 kcal/mL, preferably 1.8-2.5 kcal/mL, even more preferably 1.9-2.1 kcal/mL.

"Sip feed" herein refers to a solution that can be taken directly by a straw from a container. Alternatively, the solution can be poured into a glass and swallowed.

"Nutritionally complete" refers to nutritional compositions suitable as sole source of nutrition. Nutritionally complete nutritional compositions comprise at least a protein component, a lipid component, a carbohydrate component, vitamins and minerals. The nutrient requirements with respect to minerals and vitamins are known to the skilled artisan and can be found in standard nutritional guidelines such as EU commission directive 1999/21/EC. Suitable nutrients according to the present disclosure fulfil the requirements of/are listed in regulation (EU) No 609/2013.

"Protein component" as used herein refers to the entirety of ingredients of the nutritional compositions declarable as "protein". "Lipid component" as used herein refers to the entirety of ingredients of the nutritional compositions declarable as "lipid". "Carbohydrate component" as used herein refers to the entirety of ingredients of the nutritional compositions declarable as "carbohydrate".

A composition "consisting of" a number of ingredients or components is to be understood as comprising no other than the named ingredients or components. In case ranges for amounts of ingredients or components are given, the individual amount of all ingredients or components within the nutritional compositions has to be adapted such that the sum of all amounts of all present ingredients or components adds up to 100 wt. %.

"Malnutrition" as used herein refers to one or both of Option I: body mass index (BMI, kg/m2)<18.5; Option II: the combined finding of unintentional weight loss (mandatory) and at least one of either reduced BMI or a low fat free mass index (FFMI). Weight loss is defined as either >10% of habitual weight indefinite of time, or >5% over 3 months. Reduced BMI is <20 or <22 kg/m2 in subjects younger and older than 70 years, respectively. Low FFMI is <15 and <17 kg/m2 in females and males, respectively.

Protein Component

The protein component herein comprises one or more of milk, pea and soy proteins.

Another possible protein component comprises a combination of intact casein or caseinate proteins with an intact soy, pea or whey protein or mixtures thereof, wherein the ratio of casein or caseinate protein to latter proteins is 10:1 to 1:3 or 4:1 to 1:2.

A preferred protein component comprises one or more selected from the group consisting of whey protein concentrates, whey protein isolates, whey protein hydrolysates, casein, sodium caseinate, calcium caseinate, casein hydrolysates, milk protein isolates, milk protein concentrates, milk protein hydrolysates.

A particularly preferred protein component comprises a milk protein and a caseinate. An even more preferred protein component comprises milk protein concentrate and calcium caseinate. The ratio casein/caseinate to whey maybe the natural ratio or 85:15 to 92:8. The protein component provides a natural, high energy source of proteins which does not cause viscosity increase during UHT treatment and leads to a stable nutritional composition.

The protein concentration of the nutritional compositions is 9-14 g/100 ml, preferably 9-12 g/100 ml, even more preferred 10-11 g/100 ml, based on total ingredients of the liquid nutritional composition.

In preferred embodiments, the protein component provides 15-25 EN %, preferably 17-23 EN %, most preferred 19-21 EN % based on the total energy of the nutritional composition.

Carbohydrate component

The carbohydrate component comprises at least 90 wt. % of maltodextrins having a dextrose equivalent (DE) of 13-22, wherein the weight percentage is based on the total of the carbohydrate component. Preferably, the carbohydrate component comprises at least 95 wt. % of maltodextrins having a dextrose equivalent of 13-22. Even more preferred, the carbohydrate component consists of maltodextrins having a dextrose equivalent of 13-22. The carbohydrate component may comprise traces of other maltodextrins, which may be present for example in triturations of vitamins or minerals or in additives.

The inventors have found that maltodextrins of DE 12 or lower are disadvantageous in that they lead to a too viscous nutritional composition, which during UHT treatment becomes so viscous that it cannot be passed through a UHT line. While maltodextrins of DE 24 or higher do not cause aforementioned viscosity problems, they impart sweetness to a nutritional composition, resulting in nutritional compositions which taste too sweet. The inventors have surprisingly found that maltodextrins of DE 13-22, preferably DE 14-20, and in particular maltodextrins of DE 15-18, are advantageous, because they allow for UHT treatment of the liquid nutritional compositions while providing an advantageous viscosity and only a limited increase of sweetness.

In a preferred embodiment the carbohydrate component comprises at least 90 wt. % of maltodextrins of DE 15-18. In a particularly preferred embodiment the carbohydrate component comprises at least 95 wt. % of maltodextrins of DE 15-18. In an even more preferred embodiment, the carbohydrate component consists of maltodextrins of a DE 15-18. The carbohydrate component may comprise traces of other maltodextrins, which may be present for example in triturations of vitamins or minerals or in additives. The maltodextrins of a DE 15-18 have the advantage that, while providing the necessary energy, a minimum sweetness is imparted to the nutritional compositions and the viscosity of the nutritional compositions is kept low due to the favourable balance of long, middle and short chain carbohydrates comprised in the maltodextrins of DE 15-18. Because of this the nutritional compositions herein can withstand a UHT treatment.

The dextrose equivalent (DE) of maltodextrins is measured according to methods of the Pharmacopeia Europaea.

Small weight percentages of lactose present in the nutritional composition herein originate from the protein component. The nutritional compositions herein do not contain added sugars. Any minor weight percentages of sugar present in the nutritional compositions herein originate from the maltodextrins of DE 13-22, preferably DE 14-20, more preferably DE 15-18, due to the distribution of chain lengths of the carbohydrate polymers.

The carbohydrate component provides 45-50 EN %, preferably 42-48 EN %, more preferably 44-46 EN % based on the total energy of the nutritional compositions.

Lipid Component

The lipid component comprises lipids of animal and/or vegetable origin.

The lipid of vegetable origin is preferably a vegetable oil. The vegetable oil may be provided by one or more selected from the group of sunflower oil, rapeseed oil, safflower oil, corn oil, canola oil, olive oil, algae oil. Preferably the lipid component comprises a mixture of sunflower oil and rapeseed oil. Even more preferred, the lipid component comprises a mixture of high oleic sunflower oil and rapeseed oil.

The lipid of animal origin is preferably a marine or freshwater fish oil.

The lipids of animal and/or vegetable origin may comprise long chain fatty acids, preferably in the form of triglycerides comprising mono-unsaturated (MUFA), polyunsaturated (PUFA) and saturated fatty acids (SFA). Preferably the lipid of vegetable origin comprises long chain fatty acids, preferably in the form of triglycerides comprising mono-unsaturated (MUFA), polyunsaturated (PUFA) and saturated fatty acids (SFA). Suitable lipids of vegetable origin comprising long chain fatty acids, polyunsaturated (PUFA) and saturated fatty acids (SFA) are sunflower oil, rapeseed oil, safflower oil, corn oil, canola oil, olive oil, algae oil. For example, the mixture of sunflower oil and rapeseed oil may provide the long chain fatty acids, comprising mono-unsaturated (MUFA), polyunsaturated (PUFA) and saturated fatty acids (SFA). The high oleic sunflower oil comprises 75-90 wt. % of the MUFA oleic acid. The marine or freshwater fish oils comprise the omega-3 PUFAs eicosapentaenoic acid (EPA) and docosahexaenoic acid (DHA).

The lipid component provides 30-40 EN %, preferably 32-38 EN %, even more preferred 34-36 EN % based on the total energy of the nutritional compositions.

The fatty acid profile is designed to maintain normal blood cholesterol levels. Moreover, it is clinically free from cholesterol.

Vitamins, Minerals and Electrolytes

To be regarded as nutritionally complete, the nutritional compositions have to comprise vitamins and minerals in addition to the protein, lipid and carbohydrate components.

Suitable vitamins to be included in the nutritional compositions to render them nutritionally complete according to the present disclosure are Vitamin A, beta-carotene, Vitamin D2, cholecalciferol (Vitamin D3), Vitamin K1, ascorbic acid (Vitamin C), nicotinamide (niacinamide), Thiamin (Vitamin B1), Riboflavin (Vitamin B2), Vitamin B6, Niacin (vitamin B3), Folic acid (Vitamin B9), Cyanocobalamin Vitamin B12, Biotin (Vitamin B7), Vitamin E, and pantothenic acid (Vitamin B5). Vitamins are preferably added by way of a trituration using maltodextrin as a matrix or carrier. This maltodextrin is not considered part of the maltodextrin of DE 13-22. An example for rendering a nutritional composition complete in vitamins is given in Example 1.

Suitable minerals to be included in the nutritional composition to render them nutritionally complete according to the present disclosure are sodium, potassium, calcium, phosphorus, magnesium, iron, zinc, copper, selenium, manganese, chromium, molybdenum, chloride, fluoride, iodide, oxide, phosphate, hydrogenphosphate, carbonate, sulphate, and pyrophosphate. Minerals may be added in the form of a mineral component comprising a matrix on which a mineral is adsorbed. An example of a suitable matrix is maltodextrin. This maltodextrin is not considered part of the maltodextrin of DE 13-22. An example for rendering a nutritional composition complete in minerals is given in Example 1.

To satisfy European regulatory guidelines concerning nutritional compositions, to provide an acceptable savoury taste and ensure passing of the nutritional compositions through the UHT line, the nutritional compositions herein comprise a well-balanced electrolyte system. European regulatory guidelines concerning nutritional compositions prescribe a minimum sodium concentration of 60 mg/100 ml for a 2 kcal/ml composition, a potassium chloride concentration of 160 mg/100 ml for a 2 kcal/ml composition and a chloride concentration of 60 mg/100 ml for a 2 kcal/ml composition to be added to nutritional compositions. From the viewpoint of the desired savoury taste, it is desirable to increase the proportion of added sodium chloride well beyond aforementioned minimum amount. However, this is technically not possible, because nutritional compositions comprising high weight percentages of added sodium chloride will become very viscous during UHT treatment, so that they do not pass through the UHT line. For these reasons a well-balanced electrolyte system is employed in the nutritional compositions herein.

The nutritional compositions herein comprise salts of sodium and/or potassium cations and counter ions selected from the group of chlorides, carbonates, citrates, gluconates and tartrates. Preferably, the nutritional compositions comprise sodium and/or potassium salts selected from one or more of sodium chloride, potassium chloride, sodium carbonate, sodium citrate, potassium carbonate and potassium citrate. Even more preferred, the nutritional compositions comprise sodium and/or potassium salts selected from one or more of sodium chloride, sodium carbonate, potassium carbonate and potassium citrate.

During manufacture sodium chloride or potassium chloride are added in amounts of 0.5-0.9 g/L, preferably 0.6-0.8 g/L. Most preferred are amounts of 0.65 to 0.75 g/L. The total concentration of chloride ions in the nutritional composition after manufacture shall not exceed 0.9 g/L. The total concentration is 0.6-0.9 g/L, preferably 0.70-0.85 g/L, more preferably 0.75-0.80 g/L. The total concentration of chloride ions in the nutritional compositions is derived from the amount of chloride in the proteins, the amount of chloride in added sodium chloride and other sources.

Sodium carbonate is added to the nutritional compositions at 0.25-0.7 g/L, preferably 0.4-0.7 g/L, more preferably, 0.5-0.6 g/L.

Sodium citrate is added to the nutritional compositions at 0.5-3.0 g/L, preferably 1.5-2.5 g/L.

Potassium carbonate is added to the nutritional compositions at 0.25-1.00 g/L, preferably 0.4-0.9 g/L, more preferably 0.50-0.85 g/L.

Potassium citrate is added to the nutritional compositions at 0.5-3.0 g/L, preferably 1.5-2.5 g/L.

If the above citrates are added to the nutritional compositions in concentrations higher than above, coagulation and/or precipitation due to reaction with the calcium ions comprised in the protein component will occur. The nutritional compositions will not pass through the UHT line. Admixing the citrates in concentration as described above avoids coagulation and/or precipitation affording a nutritional composition that passes the UHT line.

Additives

The nutritional compositions herein optionally comprise food additives. Additives are typically present in total amounts of less than 10 wt. %, 5 wt. % or even less than 1 wt. % based on the total weight of the nutritional compositions. Exemplary additives are choline such as choline hydrogen tartrate, beta-carotene, lutein, lycopene, caffeine, taurine, carnitine, myo-inositol, colorants, aromas, flavourings and mixtures thereof.

Aromas and flavourings may be of the carrot, chicken, green vegetables, mushroom, pumpkin, and asparagus type. To enhance the flavour optionally sodium salts of nucleotides such as IMP and GMP are added. A flavour enhancer comprising the nucleotides disodium IMP and disodium GMP as well as maltodextrin and glycine is commercially available under the trade name TF Tide.

To enhance soup flavour, a soup taste and texture enhancing agent is optionally added. As such an agent a commercial Umami aromadevoid of a yeast is optionally added to the nutritional compositions herein. The Umami aroma comprises aroma, natural aromas, aroma extracts, sun flower oil and potato maltodextrin. This maltodextrin is not considered part of the maltodextrin of DE 13-22.

To impart a stronger soup taste to the nutritional compositions herein a sweetness masking agent suspected to block sweetness receptors is optionally added. The agent comprises aroma extracts, aroma substances, propylenglycol (E1520) and water. The flavour modifier is commercially available from Givaudan.

The additives may include stabilisers, emulsifiers, separating agents, and preservatives. A stabiliser is potassium hydrogen phosphate. Emulsifiers are lecithin (E322), preferably soy lecithin, and distilled monoglycerides of hydrogenated palm based oil, available as Monoglyceride Dimodan HP (E471). A preservative is sodium citrate (E331).

Process of Production

The nutritional compositions herein may be prepared by a standard process wherein in a first step the protein component is dissolved in water, in a second step the lipid component and emulsifiers are added to the protein-in-water mix, in a third step the remaining ingredients excluding aromas are added and in a fourth step aromas are added. In a final step, the mixture is acidified to attain a desired pH.

The present inventors found out that a stronger savoury taste is imparted to the nutritional compositions herein in a process, wherein in a first step the protein component is dissolved in water, in a second step the aromas including the sweetness masking agent and other flavour modifiers are added to the protein-in-water mix, in a third step the lipid component and emulsifiers are added, and in a fourth step the remaining ingredients are added. In a final step, the mixture is acidified to attain a desired pH.

Preferably, the nutritional compositions are obtainable in a process, wherein in a first step the protein component is dissolved in water, in a second step the sweetness masking agent is added to the protein-in-water mix, in a third step the aromas and other flavour modifiers are added, in a fourth step the lipid component and emulsifiers are added, and in a fifth step the remaining ingredients are added. In a final step, the mixture is acidified to attain a desired pH.

The nutritional compositions herein have a pH of 6.7-8. This is achieved by acidification with phosphoric acid, hydrochloric acid, citric acid, tartaric acid, malic acid, and lactic acid. Hydrochloric acid is preferred, because with the use of hydrochloric acid the requisite chloride concentration and pH are attainable without causing coagulation and/or precipitation.

Use in Treatment of Patients

The nutritional compositions herein are beneficial for patients with increased energy and protein needs or fluid restriction. These are patients at risk of or affected by malnutrition. Malnutrition is a serious health problem which impairs recovery and convalescence after or during disease, trauma or surgery.

The nutritional compositions herein are used in particular for elderly patients, patients having chronic wasting diseases such as sarcopenia, cachexia, muscle atrophy; or perioperative patients; patients suffering from poor wound healing or COP; or dialysis patients.

The nutritional compositions herein increase patients' energy and nutrient intake, improve body weight, attenuate weight loss, and increase muscle strength.

Caloric Densities and Daily Dose

The nutritional compositions herein have a caloric density of 1.8-2.8 kcal/mL, preferably 1.8-2.5 kcal/mL, even more preferably 1.9-2.1 kcal/mL.

The liquid nutritional compositions herein are suitable as sip feed.

When the nutritional compositions herein are used as sole source of nutrition, they may provide an average daily dose of 1600-2000 kcal/day. When the nutritional compositions are used as supplementary nutrition, they may provide 400-800 kcal/day.

In one embodiment, the nutritional compositions have a caloric density of 2.0 kcal/ml. A serving of 200 ml of the nutritional compositions provides 400 kcal. The solution provides 20 EN % protein, 45 EN % carbohydrate, 35 EN % fat. The recommended daily dose is at most 4-5 servings as sole source of nutrition.

The nutritional composition herein is to be consumed in at most 1-2 servings per day in case of supplemental nutrition.

Viscosity

The nutritional compositions herein have a viscosity below 700 mPa·s, measured at 20 degrees Celsius and a shear rate of 100/s. The viscosities were measured using a Haake Rheostress 1 (Thermo Fisher Scientific) equipped with a measuring cup DG43 (series 1) having the rotor DG43 as inset (DIN 53544 Titan), creating a double slit (gap) geometry.

The nutritional compositions herein have a viscosity of 100 to 700 mPa·s, preferably 100 to 400 mPa·s, even more preferably 100 to 350 mPa·s measured at 20 degrees Celsius and at a shear rate of 100/s after UHT treatment.

EXAMPLES

Example 1

A nutritionally complete liquid base composition was prepared in accordance with the process as described herein.

| Nr. | List of ingredients | | g/l |
|---|---|---|---|
| 1 | Milk protein concentrate | | 49.231 |
| 2 | Ca-caseinate | | 66.207 |
| 3 | Vitamin trituration FSMP DRINK extern (1) | | 1.250 |
| 4 | Beta carotene powder 10% CWS/S (2) | | 0.007 |
| 5 | L-ascorbic acid | | 0.080 |
| 6 | Maltodextrin of DE 15-18 | | 224.000 |
| 7 | Iron-III-pyrophosphate × 9 H2O | | 0.104 |
| 8 | Zinc sulfate - trituration 5% corresponding to Zn(II)Sulfate × 7 H2O (mg) | 42.240 | 0.192 |
| 9 | Copper sulfate - trituration 0.5% corresponding to Cu(II)SO4 (mg) | 9.952 | 0.793 |

-continued

| Nr. | List of ingredients | | g/l |
|---|---|---|---|
| 10 | Manganese chloride - trituration 0.5% corresponding to Mn(II)Cl2 × 4 H2O (mg) | 19.17 | 1.065 |
| 11 | Potassium iodide - trituration 0.0375% corresponding to KI (µg) | 540.100 | 1.100 |
| 12 | Sodium fluoride - trituration 0.5% corresponding to NaF (mg) | 5.525 | 0.500 |
| 13 | Chromium chloride - trituration 0.05% corresponding to Cr(III)Cl3 × 6 H2O (µg) | 447.300 | 0.175 |
| 14 | Sodium molybdate - trituration 0.05% corresponding to sodium molybdate × 2 H2O (µg) | 400.700 | 0.318 |
| 15 | Sodium selenite - trituration 0.025% corresponding to sodium selenite × 5 H2O (µg) | 357.400 | 0.429 |
| 16 | High oleic acid sunflower oil | | |
|    | Soy lecithin S 35 | | 0.600 |
| 17 | Rapeseed oil | | 26.440 |
| 18 | Monoglyceride Dimodan HP (3) | | 1.200 |
| 19 | Tri-potassium citrate × 1H$_2$O | | 2.687 |
| 20 | Magnesium oxide | | 0.152 |
| 21 | Sodium chloride | | 0.713 |
| 22 | Potassium carbonate (K2CO3) | | 0.830 |
| 23 | Sodium carbonate monohydrate (Na2CO3 × 1 H2O) | | 0.550 |
| 24 | Hydrochloric acid 25% | | 1.085 |
| 25 | Water | | 685.000 |
|    | Total | | 1064.78 |

Footnotes:
(1) The trituration in maltodextrin comprises: vitamin A, niacinamide, thiamine (B1), riboflavin (B2), pyridoxine (B6), vitamin K1, ascorbic acid (C), cholecalciferol (D3), vitamin E, biotin, folic acid, cyanocobalamin (B12), pantothenic acid, beta-carotene.
(2) Beta-carotene powder finely dispersed in a corn starch coated matrix of modified food starch and corn oil.
(3) Distilled monoglyceride of fully hydrogenated palm based oil.

Example 2

A flavoured nutritionally complete liquid composition was prepared in accordance with the process as described herein.

| | TO-640-645- Soup 2 kcal | | | | |
|---|---|---|---|---|---|
| Experiment: 61 Ingredients | TO-640-1 aroma Green Vegetable | TO-641 aroma Mushroom | TO-642 aroma Chicken | TO-643 aroma Pumpkin | TO-644 aroma Asparagus |
| volume (Liter) | 1 | 1 | 1 | 1 | 1 |
| Proteins (gram) | | | | | |
| Milk protein concentrate | 49.231 | 49.231 | 49.231 | 49.231 | 49.231 |
| Ca-caseinate | 66.207 | 66.207 | 66.207 | 66.207 | 66.207 |
| Carbohydrates (gram) | | | | | |
| Maltodextrin DE 15-18 | 224 | 224 | 224 | 224 | 224 |
| Electrolytes (gram) | | | | | |
| Tri-potassium citrate | 2.687 | 2.687 | 2.687 | 2.687 | 2.687 |
| Magnesium oxide | 0.152 | 0.152 | 0.152 | 0.152 | 0.152 |
| Sodium chloride | 0.713 | 0.713 | 0.713 | 0.713 | 0.713 |
| Dipotassium carbonate | 0.83 | 0.83 | 0.83 | 0.83 | 0.83 |
| Disodium carbonate (monohydrate) | 0.55 | 0.55 | 0.55 | 0.55 | 0.55 |
| Trace elements (gram) | | | | | |
| Iron-III-pyrophosphate × 9 H2O | 0.104 | 0.104 | 0.104 | 0.104 | 0.104 |
| Zinc trituration 5% | 0.192 | 0.192 | 0.192 | 0.192 | 0.192 |
| Copper trituration 0.5% | 0.793 | 0.793 | 0.793 | 0.793 | 0.793 |
| Manganese trituration 0.5% | 1.065 | 1.065 | 1.065 | 1.065 | 1.065 |
| Iodide trituration 0.0375% | 1.1 | 1.1 | 1.1 | 1.1 | 1.1 |
| Fluoride trituration 0.5% | 0.5 | 0.5 | 0.5 | 0.5 | 0.5 |
| Chromium trituration 0.05% | 0.175 | 0.175 | 0.175 | 0.175 | 0.175 |
| Molybdate trituration 0.05% | 0.318 | 0.318 | 0.318 | 0.318 | 0.318 |
| Selenite trituration 0.025% | 0.429 | 0.429 | 0.429 | 0.429 | 0.429 |
| Fats & oils (gram) | | | | | |
| High oleic acid sunflower oil | 51.33 | 51.33 | 51.33 | 51.33 | 51.33 |
| Monoglyceride Dimodan HP | 1.2 | 1.2 | 1.2 | 1.2 | 1.2 |
| Rapeseed oil | 26.44 | 26.44 | 26.44 | 26.44 | 26.44 |
| Lecithin | 0.6 | 0.6 | 0.6 | 0.6 | 0.6 |
| Vitamins (gram) | | | | | |
| Vitamin trituration FSMP Drink | 1.25 | 1.25 | 1.25 | 1.25 | 1.25 |
| L-ascorbic acid | 0.08 | 0.08 | 0.08 | 0.08 | 0.08 |
| others (gram) | | | | | |
| hydrochloric acid 25% | 0.785 | 0.785 | 0.785 | 0.785 | 0.785 |
| TF Tide (flavour enhancer) (1) | 1 | 1 | 1 | 1 | 1 |
| Aroma and colours | 8.11 | 5.46 | 3.5 | 7.85 | 3.7 |

-continued

| TO-640-645- Soup 2 kcal | | | | | |
|---|---|---|---|---|---|
| Flavour Modifier/Sweetness Masking | 0.5 | 0.5 | 0.5 | 0.5 | 0.5 |
| Umami Aroma JW | | | 1.5 | 1.5 | 1.5 |
| water (ml) | 685 | 685 | 685 | 685 | 685 |
| viscosity (20° C., 100/s) | 319 | 156 | 146 | 141 | 223 |

Footnotes:
(1) flavour enhancer TF Tide comprising the nucleotides disodium IMP and disodium GMP, maltodextrin and glycine.

Example 3

An evaluation of the taste of two differently flavoured nutritional compositions herein and one product in the market was undertaken by a panel of 19 persons. A nutritional composition with a chicken aroma as per Example 2 (test product 1), a nutritional composition having a green vegetable aroma as per Example 2 (test product 2) and Nestle's Resource soup vegetable crème (1.5 kcal/ml, available in a 200 ml cup, "comparative product") were used in the tasting test. The test was carried out under controlled conditions: The products were heated to around 60 degrees Celsius using a microwave (600 W, 90 seconds). 4 cl of product samples were served in cups having caps at 50-60 degrees Celsius. Samples of each product were provided to panelists at the same time in random presentation. Water and white bread were served to allow for taste bud neutralisation in between testing samples. The panelists were required to fill in a questionnaire after having tasted each sample. Each sample had to be evaluated with regard to sweet and salty taste. The intensity of each flavour had to be rated as none, slight, moderate or strong.

Evaluation of the completed questionnaires of the panelists had the results displayed in FIG. 1 (sweet taste) and FIG. 2 (salty taste).

Evidently, the nutritional compositions herein lead to a perceived salty taste comparable to the product in the market. Moreover, the unique combination of salty and sweet flavour imparts the desired savoury note to the nutritional compositions herein.

Thus, the nutritional compositions herein provide nutrition at a higher energy density without an increase in sweet taste and without an increase in viscosity to the extent that the nutritional compositions herein are not drinkable or unsuitable for UHT treatment. The nutritional compositions herein show a taste profile similar to products in the market, while providing complete nutrition at a higher caloric density, i.e. in a lower volume than products sold in the market.

EMBODIMENTS

Embodiment 1

A high calorie, UHT treated liquid nutritional composition comprising
  protein, fat, carbohydrates, vitamins and minerals,
  having an energy density of 1.8-2.8 kcal/ml,
  wherein the protein content is 9-14 g/100 ml, and
  the carbohydrates comprise at least 90 wt. % (based on total carbohydrates) of maltodextrins having a dextrose equivalent (DE) of 13-22.

Embodiment 2

A high calorie, UHT treated liquid nutritional composition comprising
  protein, fat, carbohydrates, vitamins and minerals,
  having an energy density of 1.8-2.5 kcal/ml,
  wherein the protein content is 9-14 g/100 ml, and
  the carbohydrates comprise at least 90 wt. % (based on total carbohydrates) of maltodextrins having a dextrose equivalent (DE) of 13-22.

Embodiment 3

A high calorie, UHT treated liquid nutritional composition comprising
  protein, fat, carbohydrates, vitamins and minerals,
  having an energy density of 1.9-2.1 kcal/ml,
  wherein the protein content is 9-14 g/100 ml, and
  the carbohydrates comprise at least 90 wt. % (based on total carbohydrates) of maltodextrins having a dextrose equivalent (DE) of 13-22.

Embodiment 4

A high calorie, UHT treated liquid nutritional composition comprising
  protein, fat, carbohydrates, vitamins and minerals,
  having an energy density of 1.8-2.8 kcal/ml,
  wherein the protein content is 10-11 g/100 ml, and
  the carbohydrates comprise at least 90 wt. % (based on total carbohydrates) of maltodextrins having a dextrose equivalent (DE) of 13-22.

Embodiment 5

A high calorie, UHT treated liquid nutritional composition comprising
  protein, fat, carbohydrates, vitamins and minerals,
  having an energy density of 1.8-2.5 kcal/ml,
  wherein the protein content is 10-11 g/100 ml, and
  the carbohydrates comprise at least 90 wt. % (based on total carbohydrates) of maltodextrins having a dextrose equivalent (DE) of 13-22.

Embodiment 6

A high calorie, UHT treated liquid nutritional composition comprising
  protein, fat, carbohydrates, vitamins and minerals,
  having an energy density of 1.9-2.1 kcal/ml,
  wherein the protein content is 10-11 g/100 ml, and
  the carbohydrates comprise at least 90 wt. % (based on total carbohydrates) of maltodextrins having a dextrose equivalent (DE) of 13-22.

Embodiment 7

The high calorie, UHT treated liquid nutritional composition according to embodiments 1 to 6, wherein the maltodextrins have a DE of 14-20.

Embodiment 8

The high calorie, UHT treated liquid nutritional composition according to embodiment 7, wherein the carbohydrates consist of maltodextrins having a DE of 14-20.

Embodiment 9

The high calorie, UHT treated liquid nutritional composition according to embodiments 1 to 7, wherein the maltodextrins have a DE of 15-18.

Embodiment 10

The high calorie, UHT treated liquid nutritional composition according to embodiment 9, wherein the carbohydrates consist of maltodextrins having a DE of 15-18.

Embodiment 11

The high calorie, UHT treated liquid nutritional composition according to any of the preceding embodiments, wherein protein presents 15-25 EN %, fat 30-40 EN %, and carbohydrates 40-50 EN % of the total caloric content of the nutritional composition.

Embodiment 12

The high calorie, UHT treated liquid nutritional composition according to any of the preceding embodiments, wherein the total concentration of chloride ions in the nutritional composition is 0.6-0.9 g/L.

Embodiment 13

The high calorie, UHT treated liquid nutritional composition according to embodiment 12, wherein the total concentration of chloride ions in the nutritional composition is 0.70-0.85 g/L.

Embodiment 14

The high calorie, UHT treated liquid nutritional composition according to embodiment 13, wherein the total concentration of chloride ions in the nutritional composition is 0.75-0.80 g/L.

Embodiment 15

The high calorie, UHT treated liquid nutritional composition according to any of the preceding embodiments, wherein the protein is selected from one or more of milk protein, milk protein isolate, milk protein concentrate, casein, sodium caseinate and calcium caseinate.

Embodiment 16

The high calorie, UHT treated liquid nutritional composition according to any of the preceding embodiments, wherein the fat is selected from vegetable oils.

Embodiment 17

The high calorie, UHT treated liquid nutritional composition according to any of the preceding embodiments, comprising salts of sodium and/or potassium cations and anions selected from the group of chlorides, carbonates, citrates, gluconates, and tartrates.

Embodiment 18

The high calorie, UHT treated liquid nutritional composition according to embodiment 17, comprising sodium carbonate at 0.25-0.60 g/L.

Embodiment 19

The high calorie, UHT treated liquid nutritional composition according to embodiments 17 or 18, comprising sodium citrate at 0.5-3.0 g/L.

Embodiment 20

The high calorie, UHT treated liquid nutritional composition according to any of embodiments 17 to 19, comprising potassium carbonate at 0.25-0.90 g/L.

Embodiment 21

The high calorie, UHT treated liquid nutritional composition according to any of embodiments 17 to 20, comprising potassium citrate at 0.5-3.0 g/L.

Embodiment 22

The high calorie, UHT treated liquid nutritional composition according to any of embodiments 1 to 21, having a pH of 6.7-8 achieved by the addition of an acid.

Embodiment 23

The high calorie, UHT treated liquid nutritional composition according to embodiment 22, wherein the acid is selected from the group of phosphoric acid, hydrochloric acid, citric acid, tartaric acid, malic acid and lactic acid

Embodiment 24

The high calorie, UHT treated liquid nutritional composition according to embodiment 23, wherein the acid is selected from hydrochloric acid.

Embodiment 25

The high calorie, UHT treated liquid nutritional composition according to any of embodiments 1 to 24, comprising a soup taste enhancing agent and/or a sweetness masking agent.

Embodiment 26

The high calorie, UHT treated liquid nutritional composition according to any of embodiments 1 to 25 having a viscosity of 100-700 mPa·s measured at 20° C. and a shear rate of 100/s.

Embodiment 27

The high calorie, UHT treated liquid nutritional composition according to embodiment 26 having a viscosity of 100-400 mPa·s measured at 20° C. and a shear rate of 100/s.

Embodiment 28

The high calorie, UHT treated liquid nutritional composition according to embodiment 27 having a viscosity of 100-350 mPa·s measured at 20° C. and a shear rate of 100/s.

Embodiment 29

The high calorie, UHT treated liquid nutritional composition according to any of embodiments 1 to 28 obtainable by a process comprising
- a first step wherein the protein is dissolved in water,
- a second step wherein the sweetness masking agent is added, and
- one or more subsequent steps wherein all remaining ingredients are added.

The invention claimed is:

1. A UHT treated liquid nutritional composition comprising
   - 9-14 g/ 100 ml of protein,
   - 0.6-0.9 g/L of chloride ions,
   - fat,
   - carbohydrates comprising at least 90 wt.% (based on total amount of carbohydrates) of maltodextrins having a dextrose equivalent (DE) of 15-18,
   - vitamins and minerals wherein said composition has a total caloric content of 1.8-2.8 kcal/ml.

2. The UHT treated liquid nutritional composition according to claim 1, further comprising protein in an amount of 15-25 EN % of the total caloric content of the nutritional composition,
   fat in an amount of 30-40 EN % of the total caloric content of the nutritional composition, and carbohydrates in an amount of 40-50 EN % of the total caloric content of the nutritional composition.

3. The UHT treated liquid nutritional composition according to claim 1, wherein the protein is selected from one or more of milk protein, milk protein isolate, milk protein concentrate, casein, sodium caseinate and calcium caseinate.

4. The UHT treated liquid nutritional composition according to claim 1, wherein the fat is selected from vegetable oils.

5. The UHT treated liquid nutritional composition according to claim 1, further comprising: salts of sodium cations, potassium cations, chloride anions, carbonate anions, citrate anions, gluconate anions, or tartrate anions.

6. The UHT treated liquid nutritional composition according to claim 5, further comprising sodium carbonate at 0.25-0.60 g/L.

7. The UHT treated liquid nutritional composition according to claim 5, further comprising sodium citrate at 0.5-3.0 g/L.

8. The UHT treated liquid nutritional composition according to claim 5, further comprising potassium carbonate at 0.25-0.90 g/L.

9. The UHT treated liquid nutritional composition according to claim 5, further comprising potassium citrate at 0.5-3.0 g/L.

10. The UHT treated liquid nutritional composition according to claim 5, wherein said composition has a pH of 6.7-8.

11. The UHT treated liquid nutritional composition according to claim 10, further comprising an acid, wherein the acid is selected from the group of phosphoric acid, hydrochloric acid, citric acid, tartaric acid, malic acid and lactic acid.

12. The UHT treated liquid nutritional composition according to claim 1, comprising Umami aroma devoid of a yeast and/or a sweetness masking agent comprising aroma extracts, aroma substances, propylenglycol (E1520) and water.

13. The UHT treated liquid nutritional composition according to claim 1,
    wherein said composition has a caloric content of 1.9-2.1 kcal/ml,
    wherein the protein is present in an amount of 10-11 g/100 ml, and
    wherein the carbohydrate component comprises at least 95 wt. % of maltodextrins based on total amount of carbohydrates, wherein the maltodextrins have a dextrose equivalent (DE) of 15-18.

14. A method of making an ultra-high temperature (UHT) treated liquid nutritional composition, wherein the method comprises:
    a first step wherein the protein is dissolved in water,
    a second step wherein a sweetness masking agent is added to the protein-in-water mix, and
    one or more subsequent steps wherein all remaining ingredients are added;
    wherein the method forms the ultra-high temperature (ULT) treated liquid nutritional composition, comprising:
    9-14 g/100 ml of protein;
    0.6-0.9 g/L of chloride ions;
    fat;
    vitamins and minerals;
    carbohydrates comprising at least 90 wt.% of maltodextrins based on total amount of carbohydrates, wherein the maltodextrins have a dextrose equivalent (DE) of 13-22; and
    wherein said composition has a total caloric content of 1.8-2.8 kcal/ml.

* * * * *